United States Patent [19]
Breitling

[11] 3,968,753
[45] July 13, 1976

[54] CIRCUIT ARRANGEMENT FOR MAGNETIC SUSPENSION VEHICLE SYSTEMS

[75] Inventor: Ulrich Breitling, Berlin, Germany

[73] Assignee: Krauss-Maffei Aktiengesellschaft, Munich, Germany

[22] Filed: Feb. 19, 1975

[21] Appl. No.: 551,054

[30] Foreign Application Priority Data
Feb. 20, 1974 Germany............................ 2408071

[52] U.S. Cl. ......................................... 104/148 MS
[51] Int. Cl.² ......................................... B61B 13/08
[58] Field of Search ...... 104/130, 148 LM, 148 MS, 104/148 SS

[56] References Cited
UNITED STATES PATENTS

| | | | |
|---|---|---|---|
| 3,763,788 | 10/1973 | Pougue.......................... | 104/148 MS |
| 3,804,024 | 4/1974 | Gottzein et al................ | 104/148 MS |
| 3,851,594 | 12/1974 | Schwarzler et al. ................. | 104/130 |
| 3,861,321 | 1/1975 | Goodnight et al................... | 104/130 |

Primary Examiner—Duane A. Reger
Assistant Examiner—Galen L. Barefoot
Attorney, Agent, or Firm—Karl F. Ross; Herbert Dubno

[57] ABSTRACT

An electromagnetic suspension vehicle system comprising a track having a pair of main armature rails on opposite sides thereof, a switch portion in which at least one of said main armature rails is interrupted, and a pair of auxiliary armature rails at least at selected locations of the switch portion. A vehicle is displaceable along the track and has at opposite sides thereof respective main electromagnets respectively cooperating with the main armature rail, and auxiliary electromagnets cooperating with the auxiliary armature rails at least at selected regions of the switch portion for suspending the vehicle on the track in the absence of suspension force from an associated main electromagnet. Separate exciting current sources are provided for each of said main electromagnets. A common exciting current source for both said auxiliary electromagnets on opposite sides of the vehicle cooperates with switching means for selectively connecting the common exciting current source with a selected auxiliary electromagnet on only one side of the vehicle.

8 Claims, 4 Drawing Figures

CIRCUIT ARRANGEMENT FOR MAGNETIC SUSPENSION VEHICLE SYSTEMS

CROSS-REFERENCE TO RELATED APPLICATIONS

This application relates to the commonly assigned copending application Ser. No. 460,620 filed Apr. 12, 1974 by Peter Schwarzler and entitled "MAGNETIC SUSPENSION VEHICLE SYSTEM" now abandoned. The application also relates to my copending application Ser. No. 460,616 filed Apr. 12, 1974 now abandoned.

These applications make reference to earlier applications which are also pertinent to the present subject matter, namely, application Ser. No. 362,012 filed May 21, 1973 (U.S. Pat. No. 3,851,594), application Ser. No. 324,135 filed Jan. 16, 1973 (U.S. Pat. No. 3,842,747), application Ser. No. 292,638 filed Sept. 27, 1972 (U.S. Pat. No. 3,804,997), application Ser. No. 280,074 filed Aug. 11, 1972 (U.S. Pat. No. 3,842,748), application Ser. No. 268,133 filed June 30, 1972 (U.S. Pat. No. 3,797,403) and application Ser. No. 268,132 filed June 30, 1972 (U.S. Pat. No. 3,804,022).

FIELD OF THE INVENTION

The present invention relates to a circuit arrangement for exciting the suspension electromagnets of a magnetic suspension vehicle and, especially, to a magnetic suspension vehicle having both main suspension magnets and auxiliary suspension magnets.

BACKGROUND OF THE INVENTION

As pointed out in application Ser. No. 460,620, the use of magnetic suspension vehicles has become increasingly significant in recent years for a variety of reasons. In conventional rail systems of the type primarily used heretofore for the transportation of passengers and freight, the vehicle speed was limited by the frictional interaction of the supporting track structure and the vehicle.

In such systems, the vehicle is carried by wheels or the like which roll upon rails of the track and are driven by electric motors or other means such that the wheels roll upon substantially continuous supporting surfaces. The wheels bear against these surfaces with rolling friction under the distributed weight of the vehicle and the load. The rolling friction increases with loading and becomes increasingly significant as vehicle speed increases.

This is not only a consequence of power loss but also a consequence of the fact that friction limits loading speed and operating life of the frictionally interengaging parts as well as the parts supporting the rolling members.

Considerable attention has been directed in recent years toward reducing the considerable friction forces which have hitherto limited high speed rail travel as described above.

In general, two approaches have been taken towards limiting frictional engagement of the vehicle with a supporting track. One such approach involves the use of a fluid cushion (for instance an air cushion) between the vehicle and the track, while the other suspends the vehicle electromagnetically from a track or other substantially continuous support. For this purpose the vehicle is provided with an electromagnetic arrangement whose cores are juxtaposed with an armature rail extending along and fixed to the track too maintain a suspension air gap between the vehicle and the track which is spanned by a magnetic field.

A typical construction of this type makes use of a T-section track having a pair of armature rails disposed along the underside of the cross bar of the T and juxtaposed with respective rows of electromagnets on the aprons of the vehicle underhanging the rails.

In another construction, the T-shaped track is provided with armature rails along the upper surfaces of the cross bar and the electromagnetic cores are juxtaposed with these rails.

Still another arrangement provides a channel configuration for the track such that the latter is generally of U-profile and the armature rails are disposed along the shanks of the U. The vehicle may have oppositely laterally extending formations carrying rows of electromagnets.

In the aforementioned applications various systems have been discovered which overcome disadvantages of both the T-section track and the channel-shaped track and which enable transfer of the vehicle from one track portion to another, i.e., to permit switching or cross-over of the vehicle from a main track to a spur track and vice versa without necessitating swinging track portions which are expensive to construct and difficult to control.

In the system described in application Ser. No. 460,620 (extending principles set forth in Ser. No. 324,135 (U.S. Pat. No. 3,842,747)), a row of main electromagnets is provided along each side of the vehicle for cooperation with main armature rails and, for each main row of electromagnets, there is provided a row of auxiliary electromagnets which cooperate with auxiliary armature rails only at switch-over portions along the track where the corresponding main electromagnet temporarily passes away from the respective main armature rail or the latter must be interrupted to permit crossover. In the system described in application Ser. No. 362,012 (U.S. Pat. No. 3,851,594) at least one subrow of each longitudinal electromagnetic arrangement or main row is in a state of magnetic interaction with an armature rail at all times during vehicle travel over the track network, i.e., as the vehicle negotiates ordinary lengths of track or at junctions, crossovers and branching regions.

The system of application Ser. No. 460,620 avoids magnetic shock and magnetic interference by providing both subrows of each magnetic arrangement (main row) and the associated armature rails in vertically offset arrangement so that each subrow of electromagnets and the associated armature rail on one side of the vehicle forms a set which is located at a different level than the other set of the same row, the lower sets of the two magnet arrangements being either the two outermost sets or the two innermost sets with respect to the vertical median plane or longitudinal axis of the vehicle.

Generally speaking the above-described system provides separate energizing sources for the main electromagnet and the auxiliary electromagnet so that they can be appropriately turned off as the vehicle passes through a spur, switch-over or curve of the track.

For example, where the auxiliary electromagnets lie relatively inwardly of the main electromagnets, the main armature rails will lie outwardly of the auxiliary armature rails and, assuming a spur to the right from a main track, the left hand main armature rail will extend continuously along the main track, the right hand main armature rail will extend continuously along the spur, the left hand main armature rail of the main track and will continue beyond the spur. Since a vehicle branching to the spur from the main track will have its main left electromagnet withdrawn from the corresponding main armature rail, its auxiliary left electromagnet must be energized to cooperate with an auxiliary armature rail during the transition to the spur and, should the vehicle travel pass the spur on the main track, its right hand electromagnet will leave its rail so that the vehicle must be supported at the right hand side by cooperation of its auxiliary right hand electromagnet with the armature rail. Consequently, the main electromagnets may have to be de-energized and re-energized at different locations at the junctions and the corresponding auxiliary electromagnets energized or de-energized to maintain the appropriate suspending and guiding forces at both vehicle sides.

In switch constructions in which the auxiliary armature rails are flanked by the main armature rails, it is necessary on the passage of the vehicle across a switch that the main electromagnet along the outer limb be de-energized and the corresponding auxiliary electromagnet switched on alternately while along the inner limb of the curve, only the main electromagnets need be energized continuously.

For convenience, in a curved track configuration, the outer limb will correspond to the outer-curved portions or the outside of a curved track while the inner limb will mean the inside of a curved track. The vehicle side sweeping the outer limb will be termed the outer-curved vehicle side while the inner limb is swept by the inner-curved vehicle side.

In systems where a common energization source is provided for both the auxiliary and main electromagnets on each side, there is the difficulty that from time to time the vehicle direction becomes ill-defined; hence such systems are undesirable since it is not possible to independently switch off the main and auxiliary electromagnets on each side.

It has been proposed to provide separate energization of the main electromagnets and auxiliary electromagnets on each vehicle side. This system has been found to be disadvantageous since it is necessary to provide separate regulating means and additional control circuits for each group of control coils. This not only increases the expense of the transportation system as a whole but, since much of the regulatory circuitry must be carried on the load-carrying vehicle, decreases the payload and creates space problems on the vehicle itself.

OBJECTS OF THE INVENTION

It is the principal object of the present invention to provide a simplified control system for an electromagnetic suspension vehicle capable of switching tracks.

Another object of the invention is to improve upon the systems described in the earlier applications and provide a track-switching electromagnetic suspension vehicle allowing independent control of the auxiliary and main electromagnets on each side of such a vehicle at lower cost and with fewer complexities than has been possible heretofore.

Still another object of the invention is to provide an improved electromagnetic suspension vehicle system of the character described whereby the aforementioned disadvantages are obviated.

SUMMARY OF THE INVENTION

These objects are attained, in accordance with the present invention, in a circuit arrangement for a magnetically suspended vehicle having, at each side of the vehicle, a respective main electromagnet and auxiliary electromagnet, each with electromagnetic coils energizable separately from one another and operable alternately or alternatively at branching, crossing, switch-over or other junction regions to support the vehicle. According to the present invention, a separate exciting current source is provided for each of the main electromagnets while a common exciting current source is provided for the auxiliary electromagnets of both vehicle sides. Means is further provided whereby the common exciting current source (simultaneously energizing the coils of the auxiliary electromagnets on both sides of the vehicle) can be connected selectively to the auxiliary electromagnet on that side of the vehicle at which a changeover between the main and auxiliary electromagnets is to be effected.

According to an important feature of the invention, the common exciting current source is connected with a regulator having an actual-value input tied by circuit means to appropriate sensors responding to the changeover between main and auxiliary electromagnets. The sensors, designed for measuring the air gap between the respective auxiliary electromagnet and armature rail, serve to activate and control the common source which is connected to the selected auxiliary electromagnet.

The advantage of the improved system described above is that the exciting current source which is common to both of the auxiliary electromagnets allows a separate exciting current source to be dispensed with and, in addition, eliminates a separate control circuit or regulating means for the exciting current of each of the auxiliary electromagnets.

In other words, it is possible to dispense with one exciting current source and one of the regulating means associated therewith.

This is of paramount importance in magnetic suspension vehicles, not only because of the high cost of the additional means which would otherwise be required, but because the addition of any weight whatsoever to the systems carried by the vehicle reduces the payload and/or requires suspension electromagnets of greater strength and therefore size as well as greater dimensioning of the electric circuitry.

Furthermore, the circuit means according to the invention makes it possible to employ the joint exciting current source for the auxiliary electromagnets as a standby unit in the event that, at a point removed from a junction or spur, one of the two exciting current sources for the main electromagnets should fail.

The coupling of the joint exciting current source and the associated regulating device with the auxiliary electromagnets of the right-hand or left-hand side of the vehicle can be carried out at a point removed from the track switch by a slow-acting switch so that no particularly involved construction is required as to the switching device.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
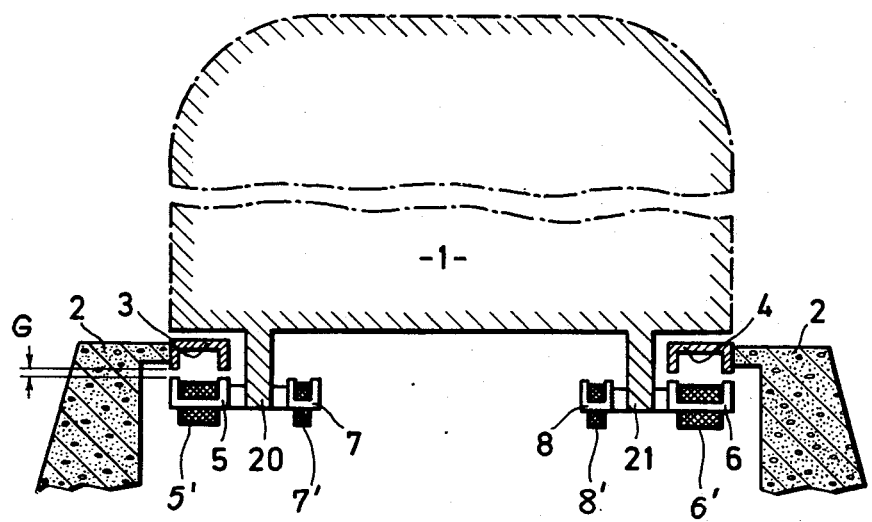
FIG. 1 is a cross-sectional view through a magnetically suspended vehicle and track structure of the type shown in greater detail in application Ser. No. 460,620 mentioned previously.

The magnetic-suspension vehicle 1, shown diagramatically in FIG. 1, has a pair of aprons 20 and 21 of inverted-T cross section with laterally projecting arms respectively carrying main electromagnets 5 and 6 auxiliary electromagnets 7 and 8. On the left side of the vehicle the main electromagnets 5 and the auxiliary electromagnet 7 which, as described in the aforementioned copending applications, are provided in spaced relation in rows parallel to the direction of travel, form an electromagnetic suspension and guide arrangement in which the main electromagnets lie in one row or subrow and the auxiliary electromagnets lie in another row or subrow. The main and auxiliary electromagnets 6 and 8 of the right hand side of the vehicle are similarly oriented.

Each of the electromagnets comprises an upwardly open U-section core carrying a coil on its web, the main electromagnets having main electromagnet coils 5', 6' and the auxiliary electromagnets having auxiliary electromagnet coils 7' and 8' respectively.

The main electromagnets 5 and 6 cooperate with main armature rails 3 and 4 having downwardly open U-cross sections and anchored to the track 2 as described in the aforementioned applications. In the position of the vehicle shown in FIG. 1, the vehicle is suspended via the main electromagnets of a suspension gap G and may be propelled by a linear induction motor as described in the aforementioned applications. In general the track 2 will be provided with a number of current supply rails which are engaged by wipers carried by the vehicle to deliver electric current to the control circuitry carried by the vehicle 1. Inwardly of the main armature rails 3 and 4, the track may be provided over its entire length or over selected locations with auxiliary armature rails of downwardly open inverted-U cross sections and anchored to frogs of the track structure as particularly shown in application Ser. No. 460,620. Where such auxiliary armature rails are provided at a track switch or spur, they take over the suspension functions when the vehicle crosses this portion of the track. Where the auxiliary armature rails are provided elsewhere, they may be used for emergency support of the vehicle should one row of main suspension electromagnets fail.

Figure 2:
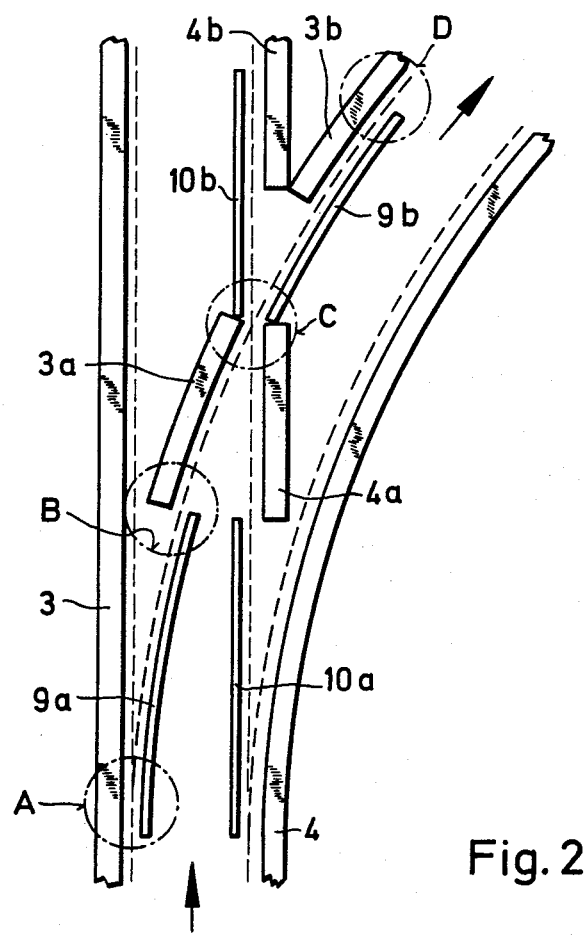
FIG. 2 is a plan view of a track switch portion of the track showing a spur to the right and constructed as described in application Ser. No. 460,620.

In FIG. 2 of the drawing, I have shown auxiliary armature rails at 9a, 9b and 10a and 10b at the entry and exiting sides of the switch and sections of main armature rail at 3a and 4a at a frog disposed at the center of the track spur.

When the vehicle 1 is traveling in the direction of the arrows (FIG. 2) and is turning to the right, the vehicle is initally supported on the continuous straight main armature rail 3 by the main electromagnet 5 at the left hand side of the vehicle and by the curved armature rail 4 via the main electromagnet 6 at the right hand side of the vehicle.

Since the vehicle 1 arrives at the point A at the beginning of the spur, the main electromagnet 5 is shut off and the auxiliary electromagnet 7 is energized to suspend the left hand side of the vehicle from the armature rail 9a while the right hand side of the vehicle has its main electromagnet 6 continuously cooperating with the continuous armature rail 4.

Since on the inner-curved vehicle side the noninterrupted armature rail 4 is present, a switchover between the main electromagnet 6 and the auxiliary electromagnet 8 is unnecessary.

At point B of the track the main electromagnet 5 is re-energized to cooperate with the main armature rail section 3a and take over the suspending and guiding function for the left hand outer curved vehicle side. In practice it is not necessary to switch off the exciting current to the auxiliary electromagnet 7 in this region since the absence of an auxiliary armature rail at this region renders the electromagnet 7 ineffective and it has been found to be advantageous, since this electromagnet will be effective in short order, to allow it to energize.

Further through the junction, in the region C at which the main rail section 3a terminates, the energized auxiliary electromagnet 7 cooperates with the auxiliary armature rail section 9b to support the vehicle. Finally, at the region D both the junction, the electromagnet 5 is reenergized and the electromagnet 7 can be deenergized so that the vehicle 1 will continue along its path supported by the main electromagnets 5 and 6 and armature rails 3b and 4.

When the vehicle is to travel on a straight path through the junction, the main electromagnet 5 remains continuously energized and continuously cooperates with the straight rail 3. At a region corresponding to point A at the right hand side of the track, however, the main electromagnet 6 is deenergized and the common exciting current source is switched to auxiliary electromagnet 8 so that the latter suspends the right hand side of the vehicle on the auxiliary armature section 10a. The electromagnet 8 continues to be energized even when, at a region corresponding to point B on the right hand side of the vehicle, the main electromagnet 6 is again energized to cooperate with the main armature rail section 4a.

At the region C, the main electromagnet 6 is deenergized and the auxiliary electromagnet 8 cooperates with the auxiliary armature rail section 10b until the vehicle has passed the junction. Thereupon the auxiliary electromagnet 8 can be cut off and main electromagnet 6 turned on so that the vehicle is again supported by the main electromagnets 5 and 6 as it continues to travel beyond the junction.

Figure 3:
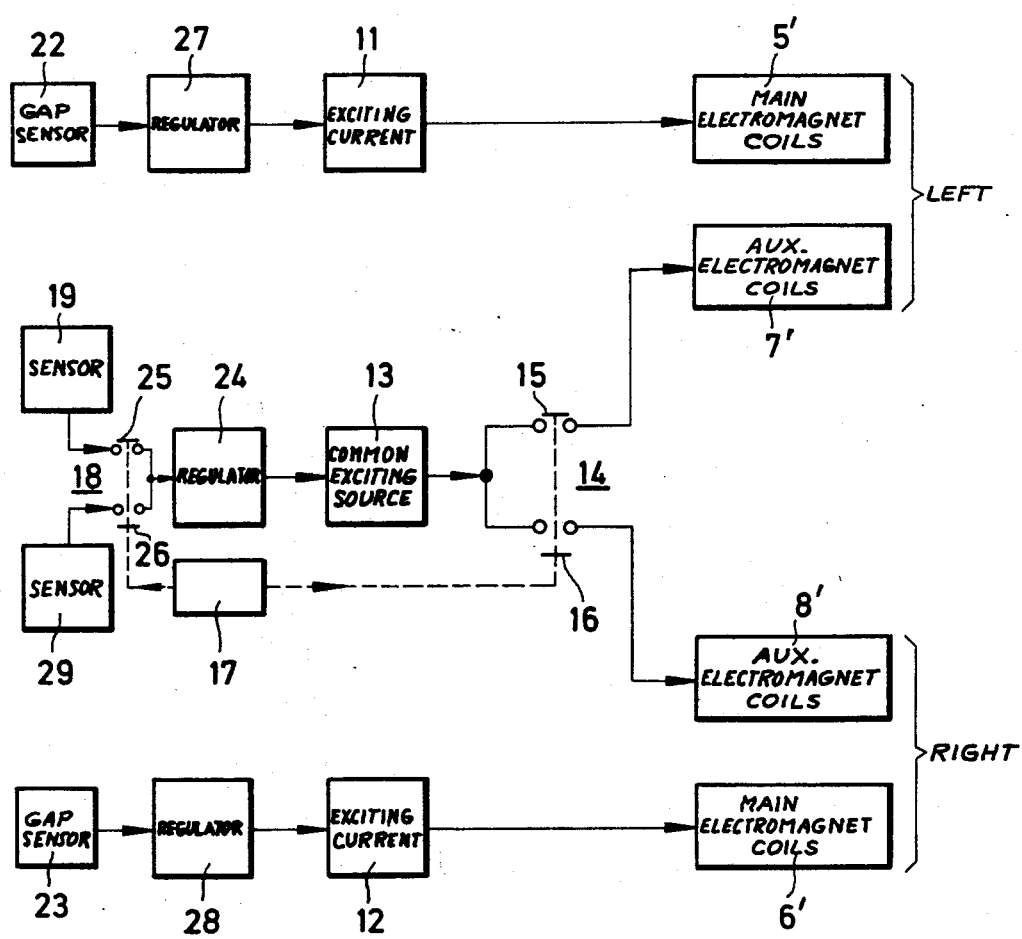
FIG. 3 is a block diagram illustrating the control circuit according to the present invention.

Since, on travel of the vehicle 1 over a track switch only one auxiliary electromagnet need be energized on one side of the vehicle, depending upon whether the vehicle is branched to the spur or continues on the main track, e.g., only the auxiliary electromagnet on the outer curved vehicle side when the vehicle negotiates the spur whereas the other auxiliary electromagnet on the other vehicle side is not energized, a common exciting current source can be provided for both of the auxiliary electromagnets 7 and 8 as described in connection with FIG. 3. A controllable switchover device connects the appropriate auxiliary electromagnet with the common exciting source as required for the particular mode of vehicle operation.

FIG. 3 shows, in block-diagram form, a system for operating the electromagnets for suspension and guidance of the vehicle 1.

The main electromagnet coils 5' and 6' on the left and right hand sides of the vehicle, respectively are each supplied by a separate exciting current source individual thereto and represented at 11 and 12 (e.g., delivering regulated exciting direct current).

Regulation of the exciting direct current is effected for each of the sources 11 and 12 individually by a regulator 27 and 28 under the control of a gap sensor 22 and 23 such that the air gaps between the pole faces of the main electromagnets 5 and 6 and the associated main armature rails 3, 3a, 3b, 4, 4a, 4b are held at a constant value.

The exciting current source, gap sensors and regulating circuitry may be that described in the commonly assigned U.S. Pat. No. 3,849,724 issued Nov. 19, 1974.

In this system the actual-value signals representing the air gaps are delivered by the gap sensors 22 and 23 to the associated regulators 27 and 28.

The coils of the auxiliary electromagnets 7' and 8' at the left and right hand side of the vehicle, respectively, are electrically energized from a common exciting current source 13 whose output can be regulated by means of the regulator 24 and can be applied via a switching device 14 to either the auxiliary electromagnet 7 our auxiliary electromagnet 8.

A further switching device 18 is provided between left-hand and right-hand sensors 19 and 29 which may be constructed as described in U.S. Pat. No. 3,849,724 and which deliver actual-value signals representing the respective air gaps to the regulator 24 depending upon the position of the electromagnets 7 and 8, respectively, and the associated auxiliary armature rails 9a, 9b and 10a, 10b respectively.

The two switching devices 14 and 18 are synchronously controlled in the same sense for left-hand and right-hand operation of the auxiliary devices. Thus when switch contact 15 is closed to operate the left hand auxiliary magnet, contact 25 can be likewise closed. Contacts 26 and 16 also can become simultaneously closed when right-hand operation of the auxiliary electromagnets is desired. The switchover devices 14 and 18 are each a four-pole-double-throw switch and can be controlled by a computer 17 which is fed with a data program representing the layout of the track, including all turns to the right and to the left and the particular course of travel of the vehicle.

Figure 4:
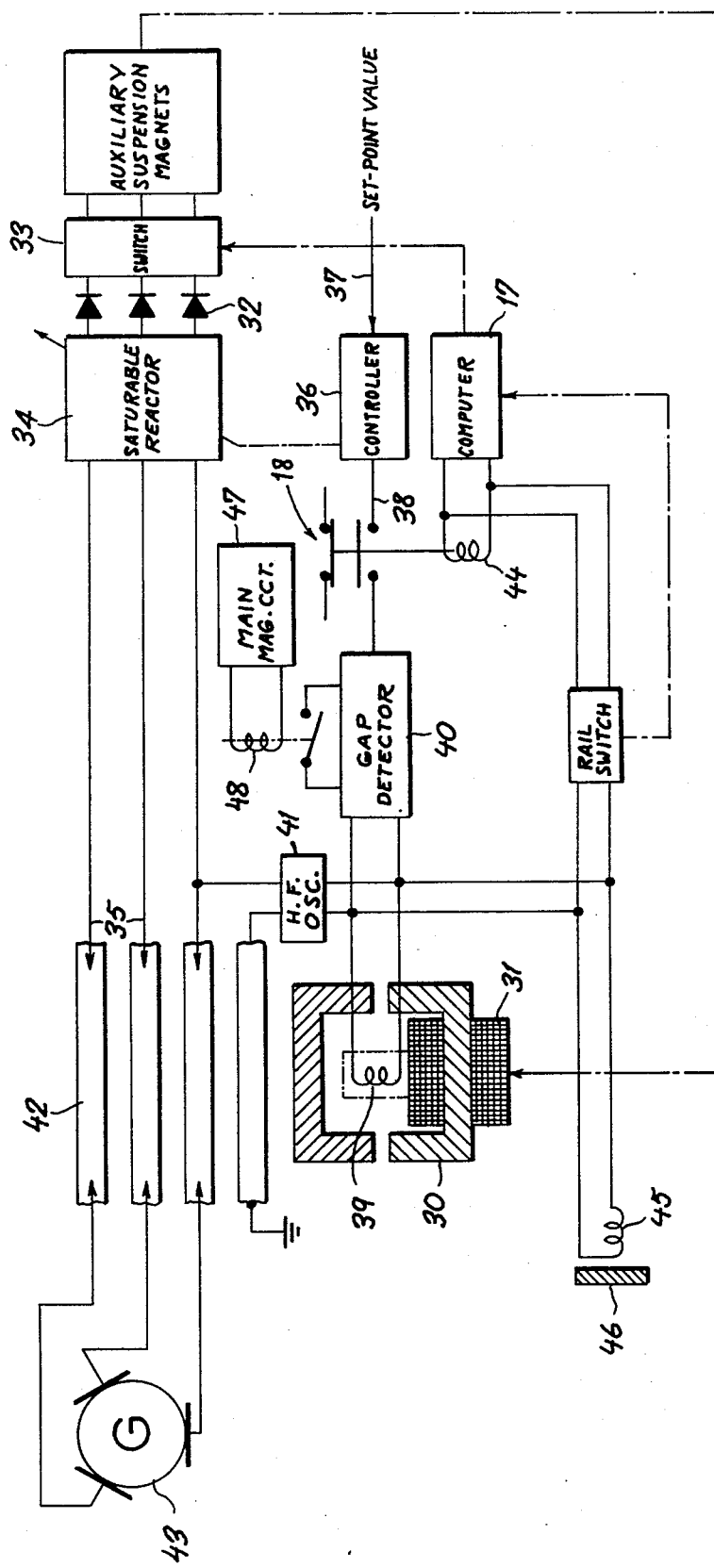
FIG. 4 is a more detailed circuit diagram of the part of the system for energizing the auxiliary electromagnets in the circuit otherwise shown in FIG. 3.

In FIG. 4 I have shown a portion of the control system for the auxiliary electromagnets in greater detail. In this system, one of the two auxiliary electromagnets is represented at 30 and has a coil 31 which is energized through the rectifiers 32 and a switch 33 corresponding to the switch 14 previously described. A saturable reactor 34 is provided between the wipers 35 of the current-collecting means of the vehicle and the auxiliary suspension magnet. The saturable reactor 34 is regulated, in turn, by a controller 36 which receives a setpoint value 37 representing the desired gap spacing and an actual value signal at 38 representing the actual gap width. Such a control system is fully described in U.S. Pat. No. 3,849,724.

The switch 18 (described in connection with FIG. 3) switches the appropriate gap detector to the controller 36. The gap detector is shown as comprising an induction coil 39 which has been illustrated in simplified form but is in reality constructed as described in the last mentioned patent. The output of this gap detector is applied at 40 to the actual value input of the controller. The coil 39 can be energized with high frequency alternating current (e.g., $1 MH_z$) if desired through an oscillator 41. The current carrying rails along the track are represented at 42 and, of course, are supplied with line current by a generator 43. The computer 17 is shown to operate the switch 18 through a relay coil 44 which may also be energized, if the computer is not used, by another inductive detector 45 responsive to a magnetically permeable member 46 disposed on the rail, e.g., at the location A, to switch on the system for the left auxiliary electromagnet. The main armature rail circuit at the left hand side of the vehicle, represented generally at 47 may have a relay 48 which independently switches the gap detector 40 to render the left hand auxiliary electromagnet operative in emergency situations. The system otherwise operates as described in connection with FIG. 3.

I claim:

1. An electromagnetic suspension vehicle system comprising:
   a track having a pair of main armature rails on opposite sides thereof, a switch portion in which at least one of said main armature rails is interrupted, and a pair of auxiliary armature rails at least at selected locations of said switch portion;
   a vehicle displaceable along said track and having at opposite sides thereof respective main electromagnets respectively cooperating with said main armature rail, and auxiliary electromagnets cooperating with said auxiliary armature rails at least at selected regions of said switch portion for suspending said vehicle on said track in the absence of suspension force from an associated main electromagnet;
   separate exciting current sources for each of said main electromagnets;
   a common exciting current source for both said auxiliary electromagnets on opposite sides of said vehicle;
   switching means for selectively connecting said common exciting current source with a selected auxiliary electromagnet on only one side of said vehicle;
   a regulator for said common exciting current source for controlling same to maintain a substantially constant suspension gap;
   respective sensors respectively associated with the auxiliary electromagnets on either side of said vehicle; and
   second switching means between said sensors and said regulators for selectively connecting a corresponding one of said sensors to said regulator in accordance with the side of the vehicle at which an auxiliary electromagnet is energized by said common exciting current source.

2. The system defined in claim 1 wherein at least one of said switching means is a four-pole-double-throw switch.

3. The system defined in claim 1, further comprising means for synchronously operating both of said switch means.

4. The system defined in claim 3 wherein each of said switch means is a four-pole-double-throw switch.

5. The system defined in claim 3 wherein each of said exciting current sources individual to said main electromagnets is provided with a respective regulator and a sensor associated with the main electromagnet and delivering an actual-value signal to said respective regulator representing the suspension gap associated with the respective main electromagnet.

6. The system defined in claim 5 wherein each of said armature rails is of downwardly open U-section and each of said electromagnets has a core of upwardly open U-section.

7. The system defined in claim 6 wherein said main armature rails are provided laterally outwardly of said auxiliary armature rails on said track and said main electromagnets flank said auxiliary electromagnets on said vehicle.

8. The system defined in claim 7 wherein said vehicle is formed where a pair of inverted T-section aprons each having a cross bar carrying a respective main electromagnet on one side and a respective auxiliary electromagnet on the opposite side.

* * * * *